UNITED STATES PATENT OFFICE.

PHILIP HICKLEY, OF EVANSTON, ASSIGNOR, BY MESNE ASSIGNMENTS, TO ROBERT D. SHEPPARD, OF COOK COUNTY, ILLINOIS.

FILAMENT FOR INCANDESCENT ELECTRIC LAMPS.

SPECIFICATION forming part of Letters Patent No. 467,169, dated January 19, 1892.

Application filed August 21, 1890. Renewed June 8, 1891. Serial No. 395,425. (No specimens.)

*To all whom it may concern:*

Be it known that I, PHILIP HICKLEY, of Evanston, Illinois, have invented or discovered a new and useful Filament for Incandescent Lamps, of which the following is a specification.

It has long been sought to find a filament for incandescent lamps which can be heated to a high degree of incandescence without shortening the life of the lamp, and in this effort many materials have been used, such as metallic substances, various forms of graphite, carbonized, fibrous, and textile materials, &c. I have found that filaments possessing the desirable qualities of long life with the capability of high incandescence can be produced from the roots of certain plants belonging to the order of *graminae* and the genus *oryza*, and particularly of the species *sativa*, commonly known as "rice-plant." This plant, as is well known, is a native of tropical countries, but has been introduced and cultivated extensively in higher latitudes, and a great many varieties are known. I have experimented with the roots of a number of varieties of the rice-plant, and among them I find that the roots of that variety known as the "Italian" will produce excellent filaments. The root of this plant is of suitable size and length for filaments and requires but little shaping to prepare it for use. In its structure it is remarkably dense and free from pores. It possesses great toughness, combined with flexibility, permitting it to be readily shaped to the desired form without in the least injuring its texture. There is sufficient variation in the size of the roots to permit their being used for the various sizes of filaments required with the expenditure of a small amount of labor. The filaments may be prepared from this material by any of the well-known methods and used in any of the common forms of lamps. These filaments in use are capable of being brought to a high state of incandescence and so maintained for a long period without deterioration.

It is known that the efficiency of incandescent lamps increases rapidly with the degree of incandescence—that is to say, the amount of light obtained with a given expenditure of electric energy is much greater when the filament is heated to a high degree of incandescence. Therefore the object sought, but heretofore imperfectly attained, has been to provide a filament capable of sustaining a high degree of incandescence for such a period of time as rendered its use economical. These qualities I find are possessed by my improved filaments in a marked degree, and I attribute the excellence of this filament mainly to the peculiar characteristic of toughness possessed by roots of the character above described, and although I have found the root of the rice-plant of the Italian variety best suited to the purpose the characteristics of density of structure and toughness are possessed by other varieties, but in a different degree.

I claim—

A filament for incandescent electric lamps of the carbonized root of the *Oryza sativa* or rice-plant.

PHILIP HICKLEY.

Witnesses:
CHAS. B. THWING,
CHARLES E. PIPER.